Apr. 10, 1923.
T. E. STEVENS
1,450,992
CRYSTALLIZER
Filed July 7, 1921
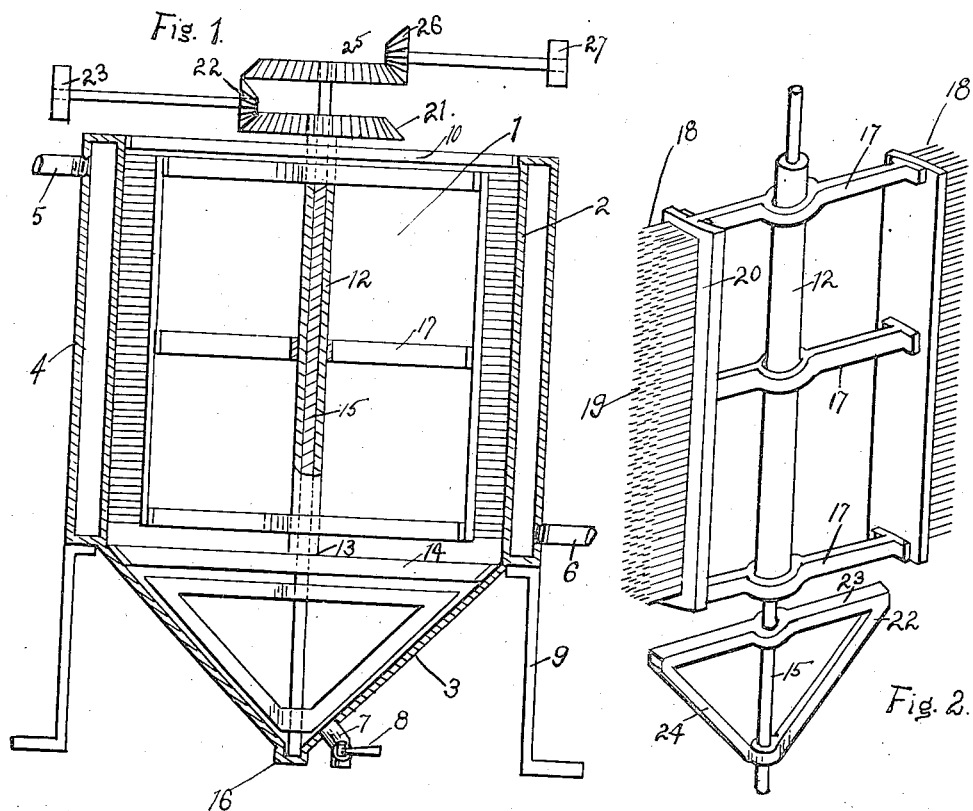
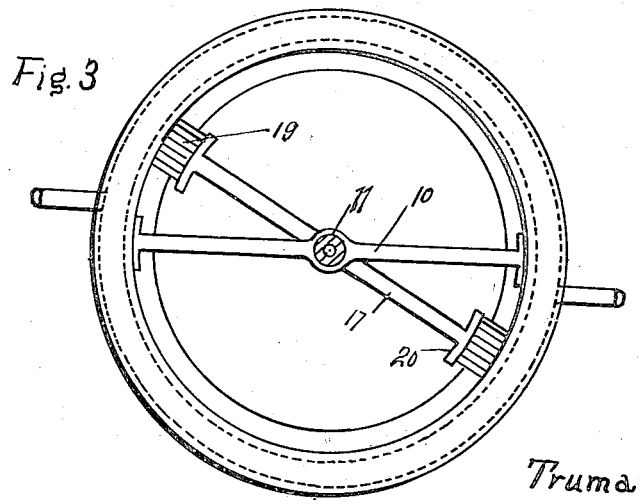
Inventor
Truman E. Stevens
By
Attorney Patented Apr. 10, 1923.

1,450,992

UNITED STATES PATENT OFFICE.

TRUMAN E. STEVENS, OF OMAHA, NEBRASKA, ASSIGNOR TO POTASH REDUCTION COMPANY, OF HOFFLAND, NEBRASKA, A CORPORATION OF NEBRASKA.

CRYSTALLIZER.

Application filed July 7, 1921. Serial No. 483,006.

*To all whom it may concern:*

Be it known that I, TRUMAN E. STEVENS, a citizen of the United States, residing at Omaha, in the county of Douglas and State of Nebraska, have invented new and useful Improvements in Crystallizers, of which the following is a specification.

This invention relates to crystallizers and more particularly to that type of crystallizer in which crystallization is forced from solutions of soluble salts by means of a cooling medium.

One of the obstacles to successful operation of crystallizers of this type when used with solutions of salts such as sodium carbonate, sodium sulphate, etc., which have the property when crystallizing of adhering to adjacent surfaces is that the crystals of such salts, as they form, adhere to the surface of the conduit carrying the cooling medium, building up a heat insulating layer which progressively decreases the cooling efficiency of said cooling medium up to the point where it is rendered practically ineffective to force further crystallization.

One of the objects of my invention is to provide a jacketed tank for carrying out the process of crystallization from solutions of soluble salts in which means is provided for mechanically removing the crystals from the jacketed tank walls as fast as they are formed.

Another object of the invention is to provide means for stirring the solution during the crystallization process for the purpose of maintaining uniform the density of the whole body of liquid within the tank.

My invention is hereinafter more fully described in connection with the accompanying drawings. Objects of a more specific nature will become apparent in the description and the essential characteristics are summarized in the claims.

Figure 1 is a front elevation partly in section of the apparatus which constitutes my invention.

Figure 2 is a perspective view of the crystal remover and agitator.

Figure 3 is a top plan view of the tank shown in Figure 1 taken in a plane just below the gears.

In the drawing the numeral 1 represents a tank having a cylindrical wall 2 and conical bottom 3. The wall 2 is surrounded by a jacket 4 which forms a space therebetween for the reception of a cooling medium such as water or liquid ammonia which is supplied by the pipe 5 and drawn off through the pipe 6. A drain pipe 7 communicates with the lower part of the conical bottom 3 and is controlled by the cock 8. The tank is mounted on suitable supports 9.

Extending transversely across the interior of the tank at the top is the member 10 apertured at 11 to form a bearing for the rotatable shaft 12. The lower end of this shaft abuts as at 13 against a similar member 14 extending transversely across the upper part of the conical portion of the tank. The shaft 12 is hollow and forms a bearing for an inner shaft 15 the lower end of which is journalled in a recess 16 at the lower end of the conical bottom portion of the tank.

Secured to the outer shaft 12 by the cross bars 17 are a pair of brushes 18 which are arranged in scraping relation to the inner surface of the wall 2 of the tank. These brushes are composed of stiff fibers or wires 19 which are mounted in a back portion 20 and extend longitudinally of the inner cylindrical wall of the tank substantially throughout the depth of the jacketed portion thereof. Upon the upper end of the shaft 12 is rigidly mounted a beveled gear 21 meshing with a smaller gear 22 driven by a pulley 23 from any desired source of power. By means of the rotation of the gear 21 the brushes are rotated in engagement with the cylindrical side walls of the tank removing therefrom the crystals as they are formed, the bristles of the brushes flexing sufficiently to detach any crystal masses which may adhere to said brushes.

Within the conical lower portion of the tank is an agitator 22 comprising a frame 23 having sloping side members 24 which are constructed to rotate in proximity to the conical inner surface of the tank. The frame 23 is fixed to the inner shaft 15 which is rotated independently of the outer shaft 12 by means of the train of gears 25 and 26 driven by the pulley 27 from a source of power. The object of the agitator 22 is to insure a thorough mixing of the hot concentrated solution in the conical portion of the tank with the cooler and more dilute solution in the cylindrical portion of the tank thus maintaining the density of the body of liquid in the tank substantially uniform. This it does by throwing the concentrated solution in the conical portion against the inclined walls thereof by centrifugal force causing a current of concentrated solution to travel upwardly, replacing the spent solution adjacent the brushes. The circulation thus set up also washes the crystals away from the neighborhood of the brushes and carries them to the central part of the cylindrical portion of the tank where they float in the unagitated body of the solution from which they may periodically be dipped out.

In order to secure a more thorough mixing of the solution the agitator is preferably driven in an opposite direction to that of the revolving brushes.

While the inner and outer shafts 12 and 15 are here shown as driven through separate sets of gearing it is obvious that it would be within the spirit of the invention to drive them through a single train of gears if desired.

It is obvious that various changes may be made in the details of construction without departing from this invention and it is therefore to be understood that this invention is not to be limited to the specific construction shown and described.

Having described my invention what I claim as new and desire to secure by Letters Patent is:—

1. In a crystallizer, a tank having a jacketed wall provided with a crystallizing surface, means for passing a cooling medium through said jacketed wall and a revolving brush having the bristles thereof engaging said crystallizing surface to remove crystals therefrom.

2. In a crystallizer, a tank having a jacketed wall provided with a crystallizing surface, means for circulating a cooling medium through said jacketed wall, a shaft journalled in said tank and a rotating brush driven by said shaft having the bristles thereof engaging said crystallizing surface.

3. In a crystallizer, a tank having a cylindrical jacketed portion and a conical bottom portion, an agitator mounted within said tank comprising rotating members in said cylindrical and bottom portions respectively, said member in said cylindrical portion being provided with a brush having bristles engaging the inner surface of said cylindrical portion.

4. In a crystallizer, a tank, having a cylindrical jacketed portion provided with a crystallizing surface and a conical bottom portion, independently driven agitators rotatably mounted within said cylindrical and conical portion respectively, said member in said cylindrical portion being provided with a brush having bristles engaging said crystallizing surface.

5. In a crystallizer, a tank having a jacketed side wall provided with a crystallizing surface and a conical bottom, a shaft journalled in said tank, an agitator mounted on the lower end of said shaft adjacent the conical bottom, a hollow shaft journalled on the first named shaft, a brush carried by said hollow shaft engaging said crystallizing surface and means for independently driving said shafts.

6. In a crystallizer, a tank having a cylindrical jacketed side wall provided with a crystallizing surface, and a conical bottom, a brush conforming to the shape of the crystallizing surface and having bristles in engagement therewith, an agitator rotatably mounted within said conical portion and having sides conforming to the slope of said conical portion and means for independently driving said brush and agitator.

In testimony whereof I have hereunto set my hand in presence of two subscribing witnesses.

TRUMAN E. STEVENS.

Witnesses:
F. A. GROOH,
G. R. STEVENSON.